United States Patent
Wall et al.

(10) Patent No.: US 10,417,587 B2
(45) Date of Patent: Sep. 17, 2019

(54) ORDER ENTRY SYSTEM FOR TELECOMMUNICATIONS NETWORK SERVICE

(75) Inventors: Richard L. Wall, Broomfield, CO (US); Kendall Gelner, Lakewood, CO (US); Brendan Sullivan, Thorton, CO (US); Sanjay Singhal, Thorton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1106 days.

(21) Appl. No.: 13/102,960

(22) Filed: May 6, 2011

(65) Prior Publication Data

US 2011/0211686 A1 Sep. 1, 2011

Related U.S. Application Data

(62) Division of application No. 10/209,527, filed on Jul. 31, 2002, now Pat. No. 7,941,514.

(51) Int. Cl.
*G06Q 10/06* (2012.01)
*G06Q 30/06* (2012.01)
(Continued)

(52) U.S. Cl.
CPC ......... *G06Q 10/06* (2013.01); *G06Q 10/0633* (2013.01); *G06Q 10/101* (2013.01);
(Continued)

(58) Field of Classification Search
CPC .......... H04M 3/4228; H04M 3/42314; H04M 3/533; H04Q 3/0029; H04Q 3/0016;
(Continued)

(56) References Cited

U.S. PATENT DOCUMENTS 5,337,352 A * 8/1994 Kobayashi et al. .......... 379/234
5,353,283 A * 10/1994 Tsuchiya ....................... 370/392
(Continued)

FOREIGN PATENT DOCUMENTS

EP 0568477 A2 11/1993
EP 0820203 A2 1/1998
(Continued)

OTHER PUBLICATIONS

Level 3 Communications, Customer Portal, slide extracts, level3 webpages http://www.level3.com/~/media/assets/interactives/mylevel3_portal_demo/index.ashx.*
(Continued)

*Primary Examiner* — Octavian Rotaru

(57) ABSTRACT

An order entry system communicates with the customer over a user interface and at the same time works with an automated installation system for installing network service. The order entry system prompts the customer to place a new service order. The service parameters of the new service order are passed to the installation system. The order entry system notifies the customer of the route and prompts the customer to add a service order for the route to the customer order. If the customer adds the service order to the customer order, the order entry system prompts the customer to reserve the service order or to submit an order for the service. If the customer reserves or submits an order for the service, the order entry system requests the installation system to design an actual communication line circuit to satisfy the order.

16 Claims, 10 Drawing Sheets

(51) Int. Cl.
*G06Q 30/02* (2012.01)
*G06Q 10/10* (2012.01)
*H04L 12/24* (2006.01)
*H04L 29/08* (2006.01)

(52) U.S. Cl.
CPC ..... *G06Q 30/0281* (2013.01); *G06Q 30/0635* (2013.01); *H04L 41/0896* (2013.01); *H04L 41/12* (2013.01); *H04L 41/145* (2013.01); *H04L 41/18* (2013.01); *H04L 41/22* (2013.01); *H04L 67/125* (2013.01); *H04L 67/14* (2013.01); *H04L 67/327* (2013.01); *H04L 67/36* (2013.01); *H04L 69/329* (2013.01)

(58) Field of Classification Search
CPC ........... G06Q 30/0611; G06Q 30/0601; G06Q 30/06; G06Q 30/08; G06Q 40/04; G06Q 30/0281; G06Q 30/02; G06Q 30/016; G06Q 10/10
USPC ............................ 379/201.05; 705/26.4, 346
See application file for complete search history.

(56) References Cited

U.S. PATENT DOCUMENTS

| | | | |
|---|---|---|---|
| 5,402,478 A * | 3/1995 | Hluchyj et al. | 379/221.01 |
| 5,586,254 A * | 12/1996 | Kondo et al. | 714/25 |
| 5,596,719 A * | 1/1997 | Ramakrishnan et al. | 709/241 |
| 5,680,448 A * | 10/1997 | Becker | 379/221.07 |
| 5,687,212 A * | 11/1997 | Kinser et al. | 379/9.03 |
| 5,687,224 A | 11/1997 | Alley et al. | |
| 5,761,432 A | 6/1998 | Bergholm et al. | |
| 5,809,282 A * | 9/1998 | Cooper et al. | 709/226 |
| 5,819,042 A | 10/1998 | Hansen | |
| 5,841,759 A * | 11/1998 | Russ et al. | 370/221 |
| 5,881,131 A | 3/1999 | Farris et al. | |
| 5,915,008 A | 6/1999 | Dulman | |
| 5,963,544 A * | 10/1999 | Ding et al. | 370/238 |
| 6,009,103 A * | 12/1999 | Woundy | 370/401 |
| 6,026,500 A * | 2/2000 | Topff et al. | 714/26 |
| 6,032,184 A * | 2/2000 | Cogger et al. | 709/223 |
| 6,058,103 A * | 5/2000 | Henderson et al. | 370/254 |
| 6,058,262 A | 5/2000 | Kawas et al. | |
| 6,061,332 A * | 5/2000 | Branton et al. | 370/241 |
| 6,104,798 A * | 8/2000 | Lickiss et al. | 379/201.12 |
| 6,134,671 A * | 10/2000 | Commerford et al. | 714/4.3 |
| 6,137,873 A | 10/2000 | Gilles | |
| 6,144,727 A * | 11/2000 | Mashinsky | 379/114.02 |
| 6,185,193 B1 * | 2/2001 | Kawakami et al. | 370/254 |
| 6,212,559 B1 | 4/2001 | Bixler et al. | |
| 6,219,648 B1 * | 4/2001 | Jones et al. | 705/7.39 |
| 6,240,463 B1 * | 5/2001 | Benmohamed et al. | 709/238 |
| 6,249,578 B1 * | 6/2001 | Gilles et al. | 379/207.13 |
| 6,262,974 B1 * | 7/2001 | Chevalier et al. | 370/232 |
| 6,298,352 B1 * | 10/2001 | Kannan et al. | 379/201.01 |
| 6,301,244 B1 * | 10/2001 | Huang et al. | 370/351 |
| 6,349,238 B1 * | 2/2002 | Gabbita et al. | 700/101 |
| 6,366,581 B1 | 4/2002 | Jepsen | |
| 6,442,258 B1 | 8/2002 | Mashinsky | |
| 6,459,702 B1 | 10/2002 | Saaverda et al. | |
| 6,463,079 B2 * | 10/2002 | Sundaresan et al. | 370/468 |
| 6,463,528 B1 | 10/2002 | Rajakarunanayake et al. | |
| 6,477,531 B1 * | 11/2002 | Sullivan et al. | 714/25 |
| 6,499,017 B1 * | 12/2002 | Feibelman et al. | 705/7.25 |
| 6,505,243 B1 | 1/2003 | Lortz | |
| 6,538,998 B1 | 3/2003 | Vasamsetti et al. | |
| 6,603,742 B1 * | 8/2003 | Steele et al. | 370/254 |
| 6,606,744 B1 * | 8/2003 | Mikurak | 717/174 |
| 6,633,638 B1 | 10/2003 | De Trana et al. | |
| 6,633,907 B1 | 10/2003 | Spencer et al. | |
| 6,636,505 B1 | 10/2003 | Wang et al. | |
| 6,643,837 B2 | 11/2003 | Campbell | |
| 6,662,221 B1 * | 12/2003 | Gonda et al. | 709/223 |
| 6,665,391 B2 | 12/2003 | Sandel et al. | |
| 6,678,355 B2 | 1/2004 | Eringis et al. | |
| 6,681,232 B1 * | 1/2004 | Sistanizadeh et al. | 709/224 |
| 6,684,213 B1 * | 1/2004 | Schell et al. | 707/999.01 |
| 6,718,330 B1 * | 4/2004 | Zenner | 707/694 |
| 6,728,267 B1 | 4/2004 | Giese et al. | |
| 6,728,782 B1 | 4/2004 | D'Souza et al. | |
| 6,741,572 B1 | 5/2004 | Graves et al. | |
| 6,742,029 B2 | 5/2004 | Vasamsetti et al. | |
| 6,754,833 B1 * | 6/2004 | Black et al. | 726/7 |
| 6,765,868 B1 | 7/2004 | Dunn et al. | |
| 6,778,651 B1 * | 8/2004 | Jost et al. | 379/201.01 |
| 6,804,722 B1 | 10/2004 | Nishi | |
| 6,810,413 B1 | 10/2004 | Rajakarunanayake et al. | |
| 6,865,268 B1 * | 3/2005 | Matthews et al. | 379/265.09 |
| 6,877,033 B1 | 4/2005 | Garrett et al. | |
| 6,891,940 B1 | 5/2005 | Bhandari et al. | |
| 6,892,169 B1 | 5/2005 | Campbell et al. | |
| 6,901,440 B1 | 5/2005 | Bimm et al. | |
| 6,948,101 B2 * | 9/2005 | Saito | 714/43 |
| 6,977,906 B2 | 12/2005 | Owens et al. | |
| 6,990,184 B2 | 1/2006 | Viel | |
| 6,997,379 B2 | 2/2006 | Boyce et al. | |
| 7,003,365 B1 | 2/2006 | Yen et al. | |
| 7,020,254 B2 * | 3/2006 | Phillips | 379/114.04 |
| 7,039,692 B2 | 5/2006 | Foster et al. | |
| 7,046,675 B2 | 5/2006 | Lund | |
| 7,047,304 B2 | 5/2006 | Senapati et al. | |
| 7,054,924 B1 | 5/2006 | Harvey et al. | |
| 7,058,716 B1 | 6/2006 | Sundaresan et al. | |
| 7,085,838 B2 | 8/2006 | Jones et al. | |
| 7,096,176 B1 | 8/2006 | Hess | |
| 7,099,935 B2 * | 8/2006 | Jordan et al. | 709/223 |
| 7,103,171 B1 * | 9/2006 | Annadata et al. | 379/265.12 |
| 7,168,044 B1 | 1/2007 | Mao | |
| 7,249,169 B2 | 7/2007 | Blouin et al. | |
| 7,269,657 B1 | 9/2007 | Alexander et al. | |
| 7,308,237 B2 * | 12/2007 | Kokkonen et al. | 455/185.1 |
| 7,352,853 B1 | 4/2008 | Shen et al. | |
| 7,689,447 B1 * | 3/2010 | Aboujaoude et al. | 705/7.15 |
| 7,716,077 B1 * | 5/2010 | Mikurak | 705/7.12 |
| 8,032,409 B1 * | 10/2011 | Mikurak | 705/14.39 |
| 2001/0037229 A1 * | 11/2001 | Jacobs et al. | 705/8 |
| 2002/0004390 A1 | 1/2002 | Cutaia et al. | |
| 2002/0004935 A1 | 1/2002 | Huotari et al. | |
| 2002/0059432 A1 | 5/2002 | Masuda et al. | |
| 2002/0078213 A1 | 6/2002 | Chang et al. | |
| 2002/0087682 A1 * | 7/2002 | Roach | 709/224 |
| 2002/0105963 A1 * | 8/2002 | Boroditsky et al. | 370/458 |
| 2002/0111842 A1 * | 8/2002 | Miles | 705/8 |
| 2002/0123983 A1 * | 9/2002 | Riley et al. | 707/1 |
| 2002/0131404 A1 * | 9/2002 | Mehta et al. | 370/352 |
| 2002/0142769 A1 | 10/2002 | Taylor | |
| 2002/0143798 A1 * | 10/2002 | Lisiecki et al. | 707/200 |
| 2002/0143872 A1 * | 10/2002 | Weiss et al. | 709/204 |
| 2002/0143888 A1 * | 10/2002 | Lisiecki et al. | 709/214 |
| 2002/0147774 A1 * | 10/2002 | Lisiecki et al. | 709/203 |
| 2002/0163882 A1 * | 11/2002 | Bornstein et al. | 370/227 |
| 2002/0168054 A1 * | 11/2002 | Klos et al. | 379/1.04 |
| 2003/0061068 A1 | 3/2003 | Curtis | |
| 2003/0074270 A1 * | 4/2003 | Brown et al. | 705/26 |
| 2003/0202468 A1 * | 10/2003 | Cain et al. | 370/229 |
| 2004/0009792 A1 | 1/2004 | Weigand | |
| 2004/0014471 A1 | 1/2004 | Weigand | |
| 2004/0249691 A1 * | 12/2004 | Schell et al. | 705/8 |
| 2004/0267872 A1 * | 12/2004 | Serdy et al. | 709/200 |
| 2005/0055466 A1 | 3/2005 | Matsuno et al. | |
| 2005/0157644 A1 | 7/2005 | Johansson et al. | |
| 2006/0075102 A1 | 4/2006 | Cupit | |
| 2006/0271928 A1 | 11/2006 | Gao et al. | |
| 2006/0282522 A1 * | 12/2006 | Lewin et al. | 709/223 |
| 2006/0293942 A1 | 12/2006 | Chaddha et al. | |
| 2007/0156476 A1 | 7/2007 | Koegler et al. | |

(56) References Cited

U.S. PATENT DOCUMENTS

2008/0010365 A1    1/2008   Schneider
2008/0256531 A1   10/2008   Gao et al.
2009/0070474 A1    3/2009   Aura et al.

FOREIGN PATENT DOCUMENTS

| | | |
|---|---|---|
| EP | 0926860 A2 | 6/1999 |
| EP | 1014627 A1 | 6/2000 |
| EP | 1263260 A1 | 12/2002 |
| WO | WO-1998/018235 A1 | 4/1998 |
| WO | WO-1999/021336 | 4/1999 |
| WO | WO-2000022788 A1 | 4/2000 |
| WO | WO-2001/041578 | 6/2001 |
| WO | WO-2001/086435 | 11/2001 |
| WO | WO-2002/017569 A2 | 2/2002 |
| WO | WO-2002/019135 | 3/2002 |
| WO | WO-2002/041578 | 5/2002 |

OTHER PUBLICATIONS

Level 3 communications, MyLevel3 Customer Portal, mylevel3 net webpages, 2011 https://mylevel3.net/portalWeb/DownloadContent?contentPath=%2FDCTM+DocBase+Repository%2FDashboardItems%2FLoginPage%2FPortal+Information%2FMyLevel3+Brochure.*

Level 3 Communications, Products and Services, level3 communications webpages, May 2000 http://www.level3.com/us/services.*

Level 3 web-based portal for Level 3 customers, effectiveui webpages http://www.effectiveui.com/work/level-3.php.*

European Patent Office, European Search Report (EPO Form 1507.0) For European Patent Application No. 03445082.5 dated Jul. 2, 2007 , 3.

"Canadian Examination Report dated Dec. 1, 2010,", counterpart Canadian Application No. 2,416,860, filed Jan. 21, 2003, ,3 pgs.

Barberis, G. "A Shortest route algorithm for graphs having weighted nodes and arcs with application to S/F communication networks", XP00066931A, *CSELT Rapporti tecnici*—V-No. 1, Mar. 1997, vol. 5. No. 1. , p. 63-66.

Dijkstra, E. W. "A Note on Two Problems in Connexion with Graphs", XP-000837527 *Numerische Mathematik 1*, vol. 1. Berlin, DE 1959 , p. 269-271.

Doshi, B. T. "Overview of INDT—A New Tool for Next Generation Network Design", *Global Telecommunications Conference, 1995, GLOBECOM '95, IEEE*, vol. 3, Issue 14-16 Nov. 1995 , pp. 1942-1946.

Ishiwa, N. "An Expert System for Planning Private Networks", *NEC Research and Development, Nippon Electric Ltd.* Tokyo, JP,vol. 35, No. 3, XP000468662A Jul. 1, 1994 , pp. 306-314.

Lee, W. C. "Routing Subject to Quality of Service Constraints in Integrated Communication Networks", 8302 *IEEE Network 9* , No. 4, New York, US US XP 526591A Jul./Aug. 1995 , p. 46-55.

Martin, J. "Computer Networks and Distributed Processing Software, Techniques, and Architecture", 1981 *Prentic-Hall, Inc.* ISBN 0-13-165258-3.

Stallings, W. "Data and Computer Communications", *Macmillan Publishing Company* ISBN 0-02-415451-2 Second Edition. 1988.

Tenenbaum, "Shortest Path Routing", *Chapter 5, The Network Layer* , XP-002189337 (1996), , p. 348-365.

"European Examination Report dated Dec. 8, 2011", App. No. 03445082.5, 8 pgs.

* cited by examiner

CUSTOMER - LOGICAL/PHYSICAL/BOTH LAYOUT - MICROSOFT INTERNET EXPLORER

SUMMARY INFO

| # | CLLI | EQUIPMENT TYPE | TID/NAME | PHYSICAL EQUIP IP ADDRESS | FLOOR | ROOM | AISLE/ ROW | BAY | SHELF MOUNT POSITION | LOGICAL SLOT LABEL/ POSITION | SUB SLOT LABEL/ POSITION | CARD | CARD AID | PHYSICAL AND LOGICAL CHANNEL/ KLM | PORT LABEL | PORT AID | EQUIPMENT ID | W/P | CONNECTION TYPE |
|---|---|---|---|---|---|---|---|---|---|---|---|---|---|---|---|---|---|---|---|
| 1 | CREATE CFA CROSS-CONNECT HERE | | | | | | | | | | | | | | | | | | |
| 2 | AUSTTXUHSY OSX G01.004.009.020-30133-AUSYXX00601101/AUSTTXUHAUS1.006.01.001-LS3-6-G7-2W-TX | | | | | | | | | | | | | | | | PATHSEGMENT | | |
| 3 | WORK OPTICAL A | | | | | | | | | | | | | | | | PATHSTRAND | | |
| 4 | AUSTTXUH | OCP | AUSTTXUHSY OSX | | 001 | 0101 | 001 | 004 | 009 | | | 20 | | | | | G01.004.009.020 | W | TIE |
| 5 | WORK OPTICAL B | | | | | | | | | | | | | | | | PATHSTRAND | | |
| 6 | AUSTTXUH | OCP | AUSTTXUHSY OSX | | 001 | 0101 | 001 | 004 | 009 | | | 14 | | | | | G01.004.009.014 | W | TIE |
| 7 | PROTECT OPTICAL A | | | | | | | | | | | | | | | | PATHSTRAND | | |
| 8 | AUSTTXUH | OCP | AUSTTXUHSY OSX | | 001 | 0101 | 001 | 003 | 003 | | | 20 | | | | | G01.003.003.020 | P | TIE |
| 9 | PROTECT OPTICAL B | | | | | | | | | | | | | | | | PATHSTRAND | | |
| 10 | AUSTTXUH | OCP | AUSTTXUHSY OSX | | 001 | 0101 | 001 | 003 | 003 | | | 14 | | | | | G01.003.003.014 | P | TIE |
| 11 | AUSTTXUH | NORTEL192 | 30133-AUSYXX0060101/ AUSTTXUHAUS1.006.01.001 | | | | | | | | | | NTCAS6BC | OC12STS12C-G7-2-1 | | OC12STS12C-G7-2-1 | | | 2 WAY ADD/DRO |
| 12 | 30133-AUSYXX00601101/AUSTTXUHAUS1.006.01.001-HS1-1-6-G-2-W-TX-6101-DAL10106810101/DLLATX37DAL1.006.01.001-2-HS1-13-G-1-W-TX | | | | | | | | | | | | | | | | PHYSICALRNGPATH | | |
| 13 | 30133-AUSYXX00601101/AUSTTXUHAUS1.006.01.001-HS1-1-6-C-2-W-TX-6101-DAL10106810101/DLLATX37DAL1.006.01.001-2-HS1-13-G-1-W-TX | | | | | | | | | | | | | | | | RNG | | |
| 14 | 000017/OC19248LSR/0007/STS12C-9 | | | | | | | | | | | | | | | | | | |
| 15 | 000017/OC19248LSR/0008/STS12C-9 | | | | | | | | | | | | | | | | | | |
| 16 | AUSTTXUH | NORTEL192 | 30133-FTW1XX00601101/ FTWQTXXTFTW1.006.01.001 | | | | | | | | | | NTCA01XK | | OC192STS12C-16-1-9 | OC192STS12C-G2-1-9 | | | LOGICAL COND |
| 17 | FTWQTXXT | NORTEL192 | 30134-FTW1XX0060101/ FTWQTXXTFTW1.006.01.001 | | | | | | | | | | | | OC192STS12C-13-1-9 | OC192STS12C-G1-1-9 | | | LOGICAL COND |
| 18 | FTWQTXXT | NORTEL192 | 30134-FTW1XX0060101/ FTWQTXXTFTW1.006.01.001 | | | | | | | | | | | OC192STS12C-13-1-9 | | OC192STS12C-G1-1-9 | | | PASS |
| 19 | 000017/OC19248LSR/0007/STS12C-9 | | | | | | | | | | | | | | | | | | |
| 20 | FTWQTXXT | NORTEL192 | 30134-FTW1XX00601101/ FTWQTXXTFTW1.006.01.001 | | | | | | | | | | | | OC192STS12C-16-1-9 | OC192STS12C-G2-1-9 | | | LOGICAL COND |
| 21 | DLLATX37 | NORTEL192 | 6101-DAL10106810101/ DLLATX37DAL1.006.01.001- | | | | | | | | | | NTCA01XK | | OC192STS12C-13-1-9 | OC192STS12C-G1-1-9 | | | LOGICAL COND |
| 22 | DLLATX37 | NORTEL192 | 6101-DAL10106810101/ DLLATX37DAL1.006.01.001- | | | | | | | | | | NTCA01XK | OC192STS12C-13-1-9 | | OC192STS12C-G1-1-9 | | | 2 WAY ADD/DRO |

FIG. 10

ORDER ENTRY SYSTEM FOR TELECOMMUNICATIONS NETWORK SERVICE

CROSS-REFERENCE TO RELATED APPLICATIONS

This application is a divisional of and claims benefit of priority to U.S. Non-Provisional patent application Ser. No. 10/209,527, entitled "ORDER ENTRY SYSTEM FOR TELECOMMUNICATIONS NETWORK SERVICE," filed Jul. 31, 2002, now U.S. Pat. No. 7,941,514 which is incorporated herein by reference for all purposes.

TECHNICAL FIELD

This invention relates to a world wide web order entry system for network service on a telecommunication network. More particularly the invention relates to ordering network service over the internet during the automated performance of the sequential tasks necessary to deliver the network service to an ordering customer.

BACKGROUND OF THE INVENTION

Modern communication networks have very large capacity, can provide real time delivery of information over diverse routes, but are highly complex in their design. Because of the complexity in the design and the many trade-offs and choices for installation of a communication line through such a network, the installation of a communication line between two end points for a customer can take four to five months. The installation involves thousands of inter-related tasks and requires many choices to be made. Once the customer's request for service has been received, an optimal route must be found. All the network elements along the route must be available. Available elements must be connectable to make up the circuit design to deliver the private line. Right now there are most likely months between the time the customer places an order for network service and the time of actual delivery of that service. This delay results in customer dissatisfaction with the network provider, and also costs the network provider lost revenue during the interval of time a communication line is being installed.

To date, the tasks performed to install a private line have been performed manually with some few exceptions for portions of the tasks. For example, computing systems have been brought to bear on the problem of finding the optimal route. However, computing systems yield results only as good as the data they work with, and the actual field inventory often differs from the stored field inventory in the computing system. What is available in the computer records may not in fact be available in the field. Further, computing systems without adequate data about the network may be programmed to make assumptions in creating a route for installation of a private line. These assumptions may not be valid when it is time to connect network elements together to complete the communication circuit design. Finally, what appears to be a valid design on the engineer's drafting board may contain network elements in the field that are not consistent with the computer information or the engineer's information and therefore are not connectable.

Further, performance of these installation tasks often results in design trade-off choices that may affect the service to the customer and thus require repeated consultation with the customer as the communication line is built. In the past the customer has placed a request for service and waited days to hear whether the network provider had the capacity to provide the service. In the past the customer has placed a reservation for a service order and waited weeks for confirmation of the reservation. In the past the customer has submitted a service order for installation of the service and waited months for delivery of the service.

It is with respect to these considerations and others that the present invention has been made.

SUMMARY OF THE INVENTION

In accordance with the present invention, the above and other problems are solved by an order entry system communicating with the customer over a user interface and at the same time communicating with an automated installation system for installing network service. The communication with the customer can be accomplished over the World Wide Web. The customer goes to the network provider's web site and signs on to gain access to the order entry system. The order entry system than conducts a conversation with the customer who is requesting service and the order entry system conducts a conversation with the automated installation system that is installing the service. The order entry performs the tasks of prompting the customer to place a new service order. The service parameters of the new service order are passed to the installation system. The installation system responds to the order entry system with a route, i.e. network service available, or no route. The order entry system notifies the customer of the route and price and prompts the customer to add a service order for the route to the customer order. If the customer adds the service order to the customer order, the order entry system prompts the customer to reserve the service order or to submit an order for the service.

If the customer reserves the service order, the order entry system requests the installation system to complete a design for an actual communication line circuit to satisfy the order. The installation system rechecks that there is capacity for the route, assigns and validates the communication line, and completes the design for the communication line circuit. Lastly, the installation returns a reserved status along with detailed information about the circuit. The order entry system informs the customer that the communication line is reserved. This occurs within minutes of requesting the reservation, and the customer can access detail information about network components along the communication line circuit if desired.

If the customer submits an order after the reservation, the order entry system sends a confirmation of the order to the customer and asks the installation for final installation and testing of the communication line circuit. The installation system works with a workflow management module in the order entry system to complete final hook-up and test of the communication line service. Any network components not controlled by the automated installation system require work site task lists for technicians to complete the hook-up. These task lists are generated by the work flow management module. Once the hook-up and test is complete, the work flow management module notifies the customer the circuit is ready and turns the circuit over to the network operations center.

The great advantage of this invention is that a communication line within the network may be designed and configured in a matter of minutes rather than months. While the customer is online requesting a service order, the customer gets immediate responses about network capacity and price, service order reserved and confirmation of submission of a service order. Subsequently, if the customer's equipment is located at or near node locations of the network, the customer's communication line may be connected to the customer's equipment and providing service as soon as manual connection to the network occurs—usually a matter of hours or days rather than months.

These and various other features as well as advantages, which characterize the present invention, will be apparent from a reading of the following detailed description and a review of the associated drawings.

BRIEF DESCRIPTION OF THE DRAWINGS

Figure 7:
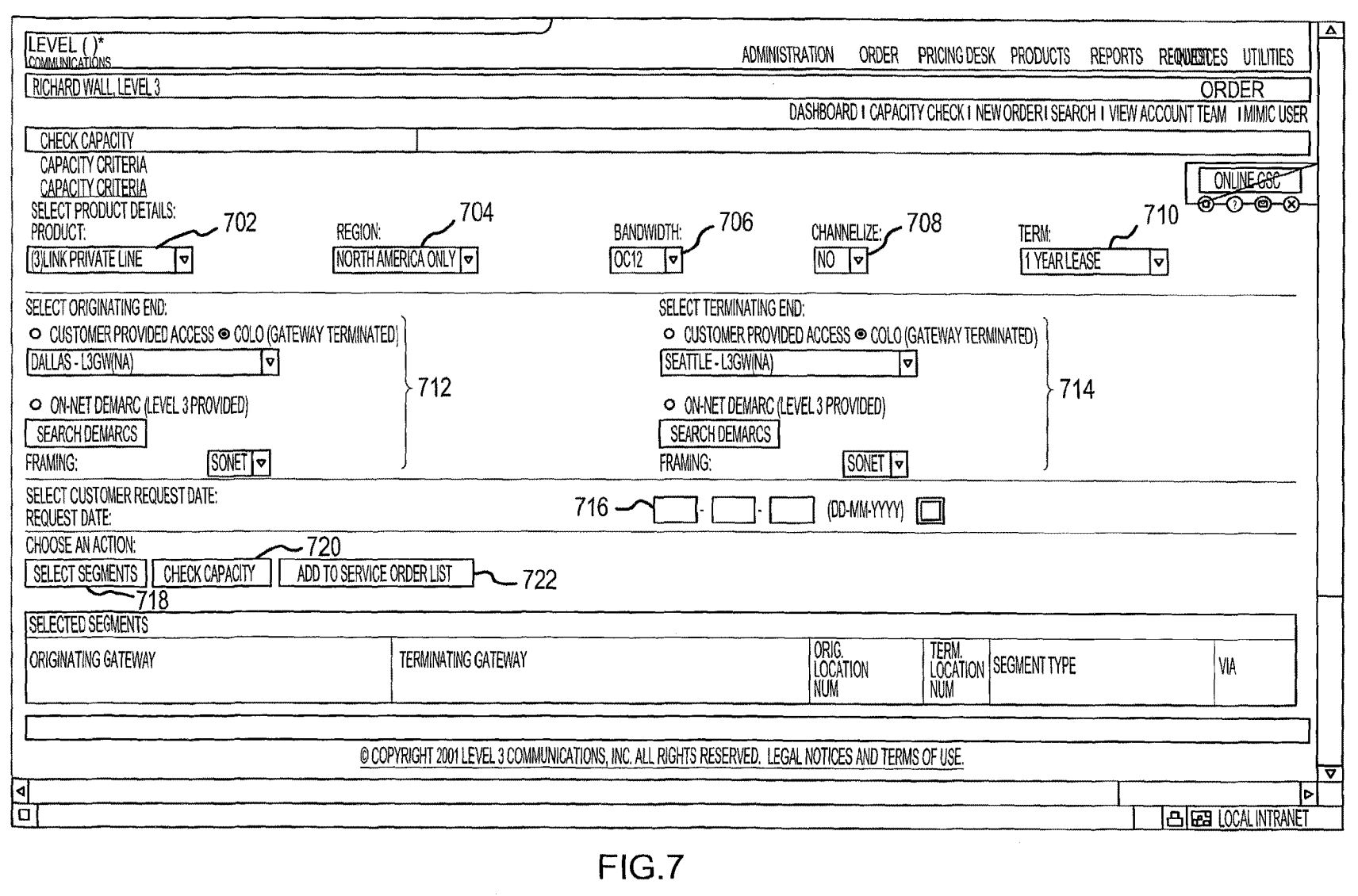

FIG. 7 is a screen shot of a Check Capacity, Capacity Criteria computer screen displayed to a customer.

FIG. 8 is a screen shot of a Check Capacity, Price and Availability computer screen displayed to a customer.

FIG. 10 is a screen shot of one screen showing a portion of a circuit layout record displayed to a customer.

DETAILED DESCRIPTION OF PREFERRED EMBODIMENTS

Figure 1:
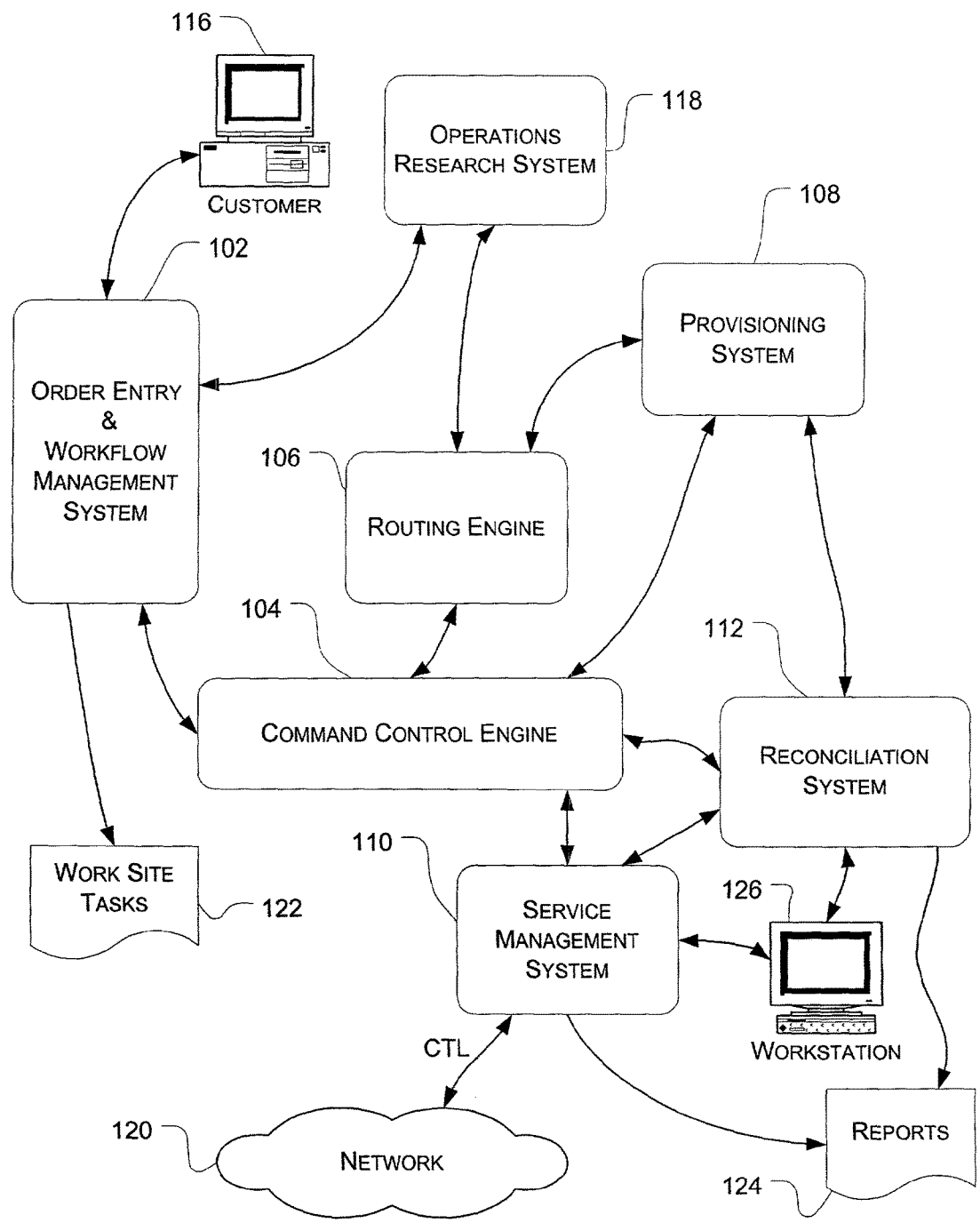
FIG. 1 shows a system for automatically installing communication lines in response to submitted orders for network service.

FIG. 1 shows the architecture of an automated installation system for delivering a communication line service to a customer with minimal delay. The communication line may be viewed as a dedicated private line or private channel through the telecommunications network over which multiple types of transmission data may be transported. The system has an order entry and work flow management system 102, a command control engine 104, a routing engine 106, a provisioning system 108, and a service management system 110. Command control engine 104 integrates the operations performed by all of the other engines and systems to control the installation system operations.

The reconciliation system 112 adds flexible adjustment of the installation system to recover and work around problems arising during the automated delivery of the communication line service. The operations research system 118 provides performance and cost information to the order entry and workflow management system 102 and network rules to the routing engine 106.

Order entry system 102 interacts with the customer through a remote computer 116 to create a customer order for the customer. The remote computer is preferably communicating with the order entry system on the internet over the World Wide Web. The customer would open the network services provider's web site and then sign-on with a prearranged user ID and password to reach the order entry system. The customer then follows prompts in user interface computer screens provided by the order entry system and described hereinafter with reference to FIGS. 7-10. The user interface screens lead the customer through the process of placing a customer order with the network provider. The customer order may contain one or more service orders; each service order specifying a network communication line service being reserved or ordered by the customer.

The order entry system will conduct a dialog with the customer at the remote computer 116 through the user interface screens. The dialog is on a real time basis with the automated installation of the communication line in that, while the service order is being created, reserved and submitted, the installation system is checking network capacity, assigning and validating network components and connecting and testing components. This dialog first collects from the customer necessary information to create a service order for the private line service, and then conducts a dialog with the customer to prompt the customer to save a service order, reserve a service order or submit a service order. The order entry system also conducts a dialog with the installation system. The order entry system works with command control engine 104 and provides real time feedback to the customer on availability, reservation and installation status for a service order.

The routing engine 106 receives commands from the control engine 104 to determine possible paths for the private line, i.e. a communication line, to be provided to the customer. The operations research system 118 provides network rules to the routing engine so that the routing engine may formulate a route for the private line. The operations research system 118 also provides cost and pricing information to the order entry system reflective of the rules being provided to the routing engine 106. Routing engine 106 under control of the command control engine returns information to the order entry system regarding the capacity of the system. The order entry system 102 can then reply to the customer in a real time basis whether the customer order can be accommodated.

One example of a routing engine is described in U.S. Pat. No. 7,146,000 (the '000 patent), filed Jan. 25, 2002, and entitled "ROUTING ENGINE FOR TELECOMMUNICATIONS NETWORK." The specification and drawings of this application are incorporated herein as an exemplary routing engine for use in this installation system.

If the customer reserves the service order or submits an order for the service, the command control engine 104 engages the provisioning system 108 to provision and assign elements to the circuit or route. Provisioning system 108 also validates the circuit or route against a network asset inventory database. If the circuit is validated then the circuit is provided to the service management system along with configuration information. Service management system 110 automatically configures the network 120 to create the private line circuit from end to end in accordance with the customer service order. Service management system 110 works with various network element-driving units to drive network elements in the network to connect and activate the private line. Once the private line is connected and activated in the network, the command control engine communicates with the order entry and workflow management system 102 to report network components it could not connect and activate. Order entry and workflow management system 102 generates worksite task lists to complete the installation of the private line circuit for the customer. In most instances all of the worksite tasks will be just those necessary at the end points or gateways to connect into the customer's systems, but the task list could also include worksite tasks along the route.

A significant aspect of the installation system is that it is designed to automatically work around problems in implementing the private line. In addition the installation system implements a network element recovery operation using the reconciliation system 112 to recover network elements marked as bad or unavailable for some reason. When the command control engine detects a failure or error in installation operations—routing, provisioning and assigning, configuration and activation then the command control engine can call the reconciliation system 112. The reconciliation system 112 receives input and cooperates with the service management system 112 and provisioning system 108 to reconcile problems in links or segments between nodes or section at nodes in the network. Such problems might include erroneous indications of availability of a segment or port, erroneous connection of a segment to a port at a network element, and in general any port or segment issues that might arise. The reconciliation system 112, along with the service management system 110, generates reports for designers and provides workstation access to the live network for the designers through workstation 126.

One example of a system for automatically installing network service is described in U.S. Pat. No. 7,251,221 (the '221 patent), filed Jan. 25, 2002, and entitled "AUTOMATED INSTALLATION OF NETWORK SERVICE IN A TELECOMMUNICATIONS NETWORK," which is incorporated herein by reference.

Figure 2:
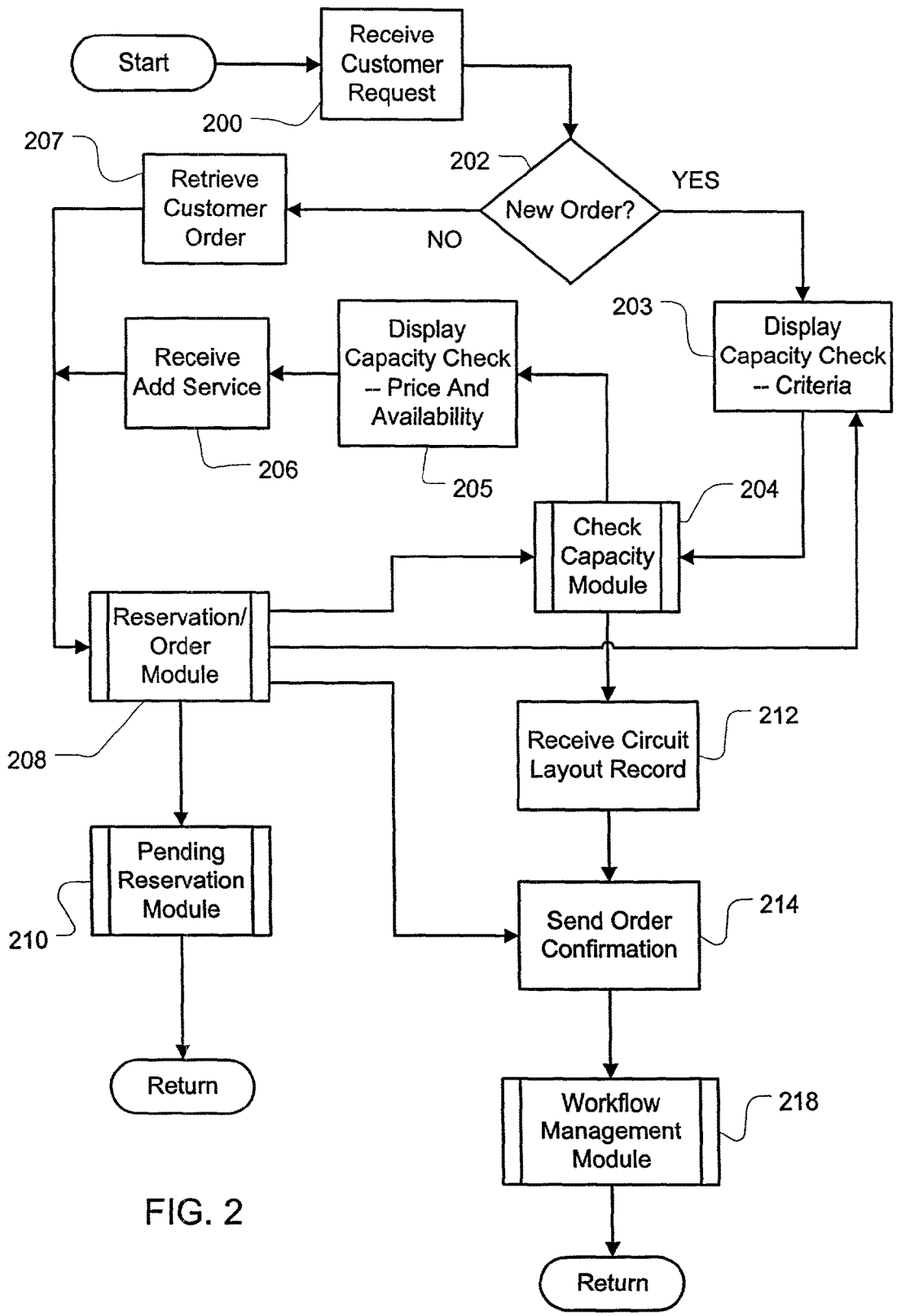
FIG. 2 illustrates one embodiment of the operations performed in the order entry and workflow management system 102 of FIG. 1.

FIG. 2 shows the operational flow for one embodiment of the order entry and work flow management system 102 (FIG. 1) which is the subject of the present invention. The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing systems implementing the invention. Accordingly, the logical operations making up the embodiments of the present invention described herein may be referred to variously as operations, structural devices, steps, acts or modules. It will be recognized by one skilled in the art that these operations, structural devices, steps, acts and modules may be implemented in software, in firmware, in special purpose digital logic, and any combination thereof without deviating from the spirit and scope of the present invention as recited within the claims attached hereto.

In FIG. 2 the operational flow begins with receipt operation 200 receiving a service request from a customer on the World Wide Web. The service request is entered by mouse clicks or keystrokes by the customer as prompted by computer screens displayed at the customer's computer 116 (FIG. 1). New order test operation 202 detects whether the request is for a new service order from the customer or for review of a previously reserved service order in a customer order. A customer order may contain one or more service orders. If request is a new service order, the operation flow branches YES to display capacity criteria operation 203. Operation 203 displays the "Check Capacity, Capacity Criteria" screen (FIG. 7) to the customer. This screen prompts the customer to enter network service parameters such as product name, geographical region, bandwidth, lease term, source or originating location, destination or terminating location and framing. The originating and terminating locations may also be referred to herein as end points or gateways.

Figure 8:
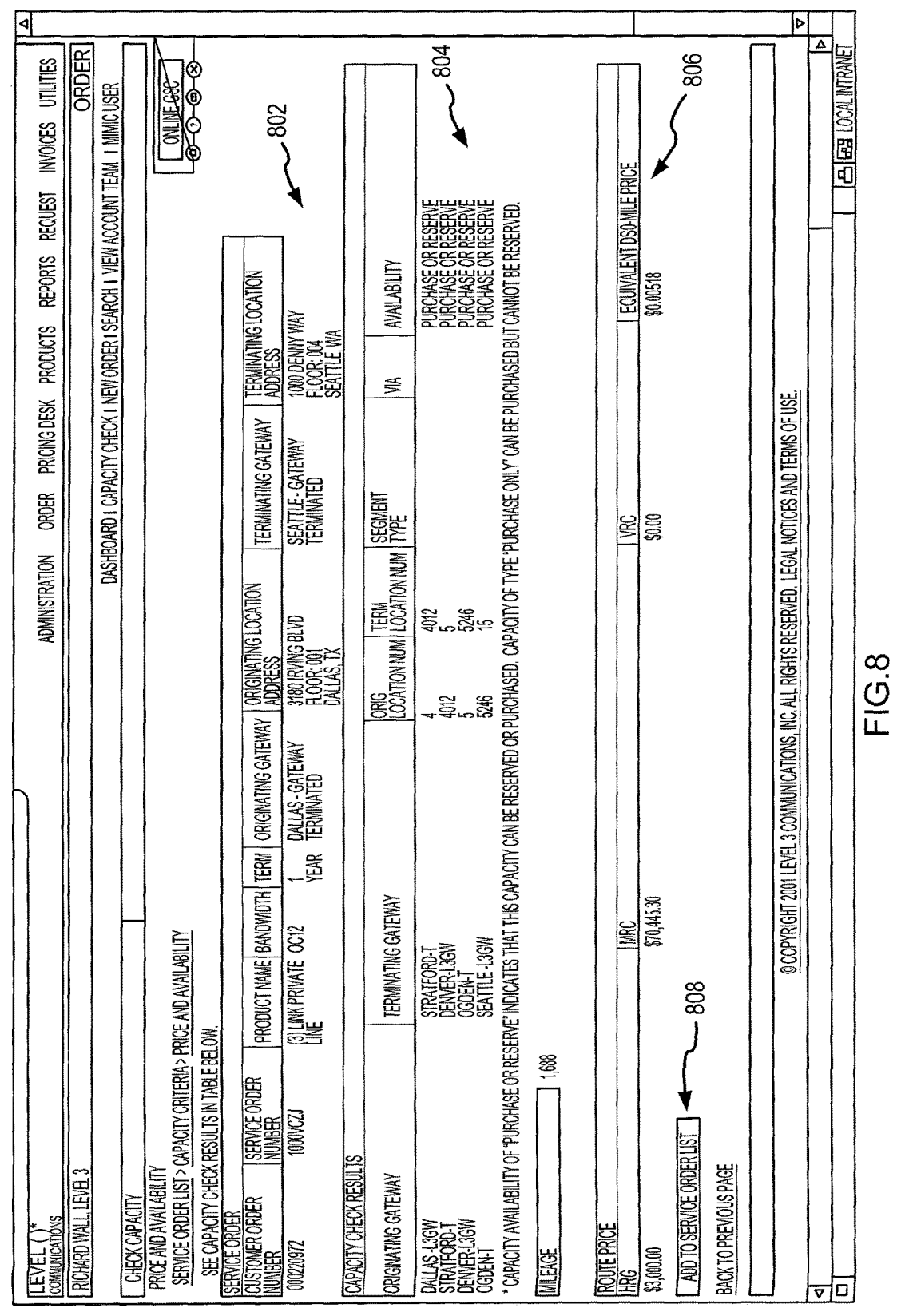

The check capacity module 204 receives theses network parameters and generates a request for a route from the installation system of FIG. 1 through the command control engine 104 (FIG. 1). The command control engine 104 working with the routing engine 106 (FIG. 1) checks the network inventory database for network capacity to satisfy the order. If a route is available, the command control engine returns high-level route information to the check capacity module. Display availability operation 205 displays this route information along with price information to the customer in the Capacity Check, Price and Availability screen (FIG. 8). When a route is available, the Price and Availability screen (FIG. 8) prompts the customer to add the service to the service order list. If the customer selects the add service button, the operation flow proceeds to reservation/order module 208. If a route is not available, the command control engine returns a no route message to the check capacity module 204. The check capacity module will display "No Route" to the customer and return operational flow to the main system operation flow. The check capacity module is described in more detail hereinafter with reference to FIG. 3.

If the customer is searching for an existing customer order and not requesting a new service order, the operation flow branches NO from new order test operation 202 to the retrieve customer order operation 206. Retrieve operation 206 retrieves a previously saved customer order and provides the information to the reservation/order module 208.

The reservation/order module 208 displays the customer order as a Service Order List screen (FIG. 9) to the customer. Module 208 displays the service order list resulting from a new order or previous customer order that has been retrieved. The Service Order List screen prompts the customer to start a new service order, save customer order, reserve bandwidth or submit customer order. The operation flow for reservation/order module 208 is shown in detailed and described hereinafter with reference to FIG. 4.

If the customer starts a new service order, reservation/order module 208 returns the operation flow back to display operation 203 to start the ordering dialog with the customer. Regarding the save order command, a customer may elect to save a customer order if for some reason the customer wishes to interrupt the ordering process and later return to the order. In this event, module 208 simply saves the customer order. When the customer returns, the customer order would be retrieved by retrieve operation 207.

If the customer elects to reserve bandwidth, reservation/order module 208 starts the process to reserve a service order. A request from module 208 to the command control engine 104 (FIG. 1) initiates a capacity recheck. The command control engine then controls the installation system of FIG. 1 to assign network components, validate the component and complete a circuit design to implement the communication line circuit. The reservation module 208 receives a circuit layout record back from the command control engine 104 (FIG. 1) which, in effect, is a message that the design is complete and the service order is reserved. The reservation/order module 208 then updates the display to the customer to indicate a reserved status for the service order. The reservation module also sets a reservation period and the number of reservation renewals that are permitted. The default reservation period is five days and the default reservation renewal is two. A customer dialog may be provided to allow these defaults to be changed for the customer.

After the reservation is completed, the operation flow proceeds to the pending reservation module 210. The pending reservation module 210 monitors the service order status. If the customer does not submit an order for the service within the predetermined reservation period of time, the reservation expires, and the network components of the circuit reserved for the service order are released back to inventory. The pending reservation module is described hereinafter with reference to FIG. 5.

When a customer elects to submit a customer order for a service, this event could occur for a reserved service order or might occur directly without the customer making a reservation. In the former event, reservation/order module 208 retrieves the reserved service order and the operation flow passes to send confirmation operation 214. In the latter event, there is no reservation and reservation/order module 208 passes operation flow back to check capacity module 204 where the sequential operations to fill the service order begin by rechecking the network capacity to be sure an unreserved route is still available.

After the network capacity is rechecked, the command control engine 104 (FIG. 1) orchestrates the installation process. This includes assigning network components, validating the components and completing the circuit design for the communication line circuit. Once the communication line circuit is completed, usually a matter of minutes, the command control engine returns the circuit layout record to the order entry system. An example of a portion of a circuit layout record is shown in FIG. 10. Receive record operation 212 receives the circuit layout record which also indicates the network components in the circuit are reserved. When the layout record is received, send confirmation operation 214 sends a service order confirmation to the customer. The customer can request to see the circuit layout record, and a copy will be displayed to the customer's computer screen.

After the sending of the order confirmation, the operation flow passes to the workflow management module 218. The workflow management module manages the final installation of the circuit to provide the network service. Workflow module 218 begins by requesting the command control engine 104 (FIG. 1) to perform final configuration and activation of the network components in the communication line circuit. Any network components, that the installation system of FIG. 1 does not have control of during configuration and activation, are identified in a uncontrolled network components list returned to the workflow management module. The workflow module generates a tasks list for technicians to complete the hook-up and test. Once the communication line circuit is ready, it is turned over to the network operations center. Operational flow returns from the workflow management system to the main system. The workflow management module is described hereinafter in more detail with reference to FIG. 6.

This completes the overall description of a preferred embodiment of the order entry and workflow management system. The operating details of modules inside the order entry and workflow management system are now described with reference to FIGS. 3-6. The check capacity module 204 of FIG. 2 and check capacity module 235 of FIG. 4 are the same design and shown in detail in FIG. 3. The operation flow for the check capacity module begins with receive parameters operation 219 in FIG. 3. Receive operation 219 receives the network service parameters entered by the customer on Capacity Criteria screen (FIG. 7). Send parameters operation 220 provides the service parameters to the command control engine 104 (FIG. 1).

The command control engine works with the routing engine 106 (FIG. 1) to find an optimal route. If a route is available, the command control engine returns high level route information to the check capacity module in the order entry system. If a route is not available, the command control returns a no route message to the check capacity module.

Figure 3:
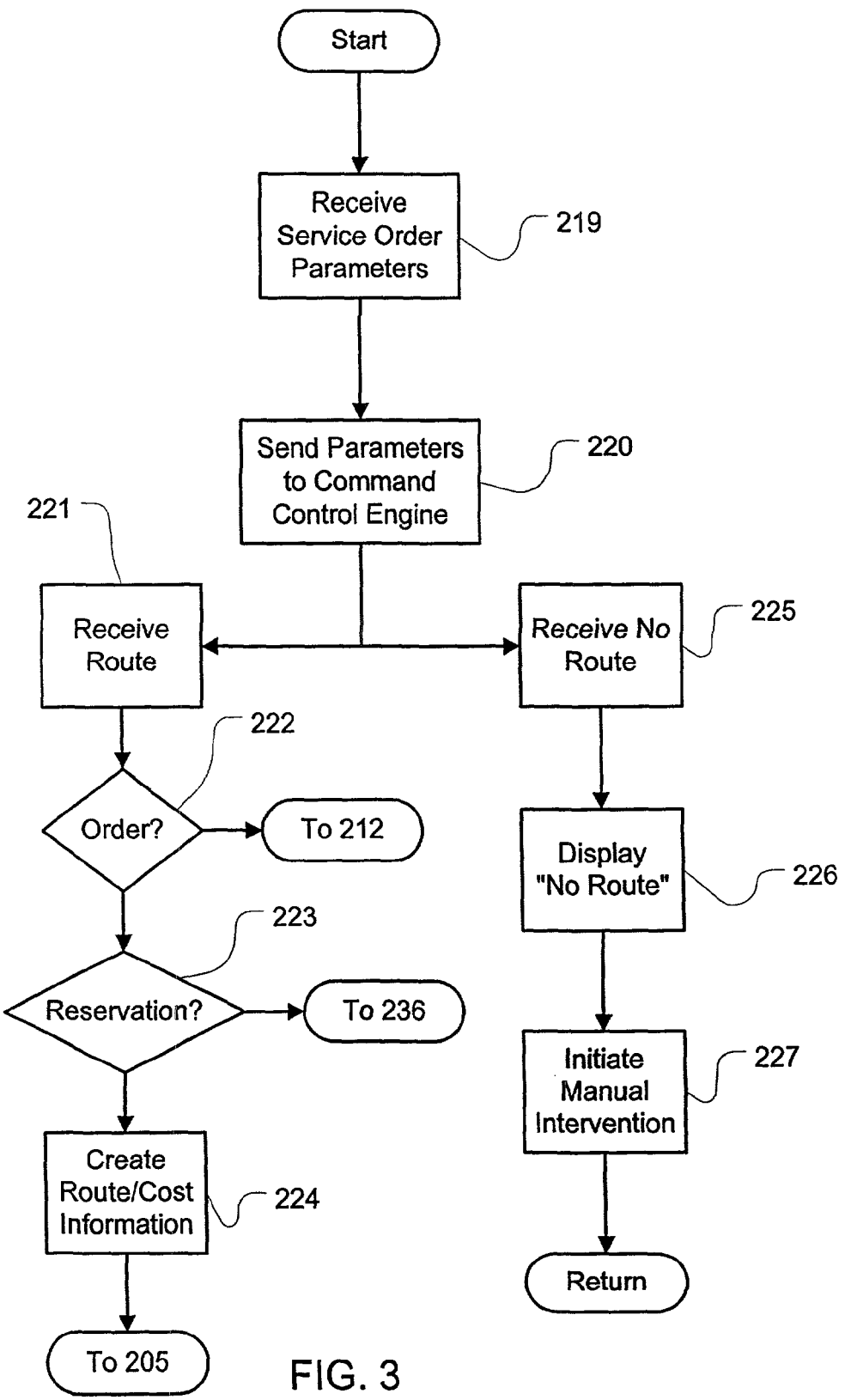
FIG. 3 illustrates the operations performed by the check capacity module 204 of FIG. 2 and the check capacity module 235 of FIG. 4.
Figure 4:
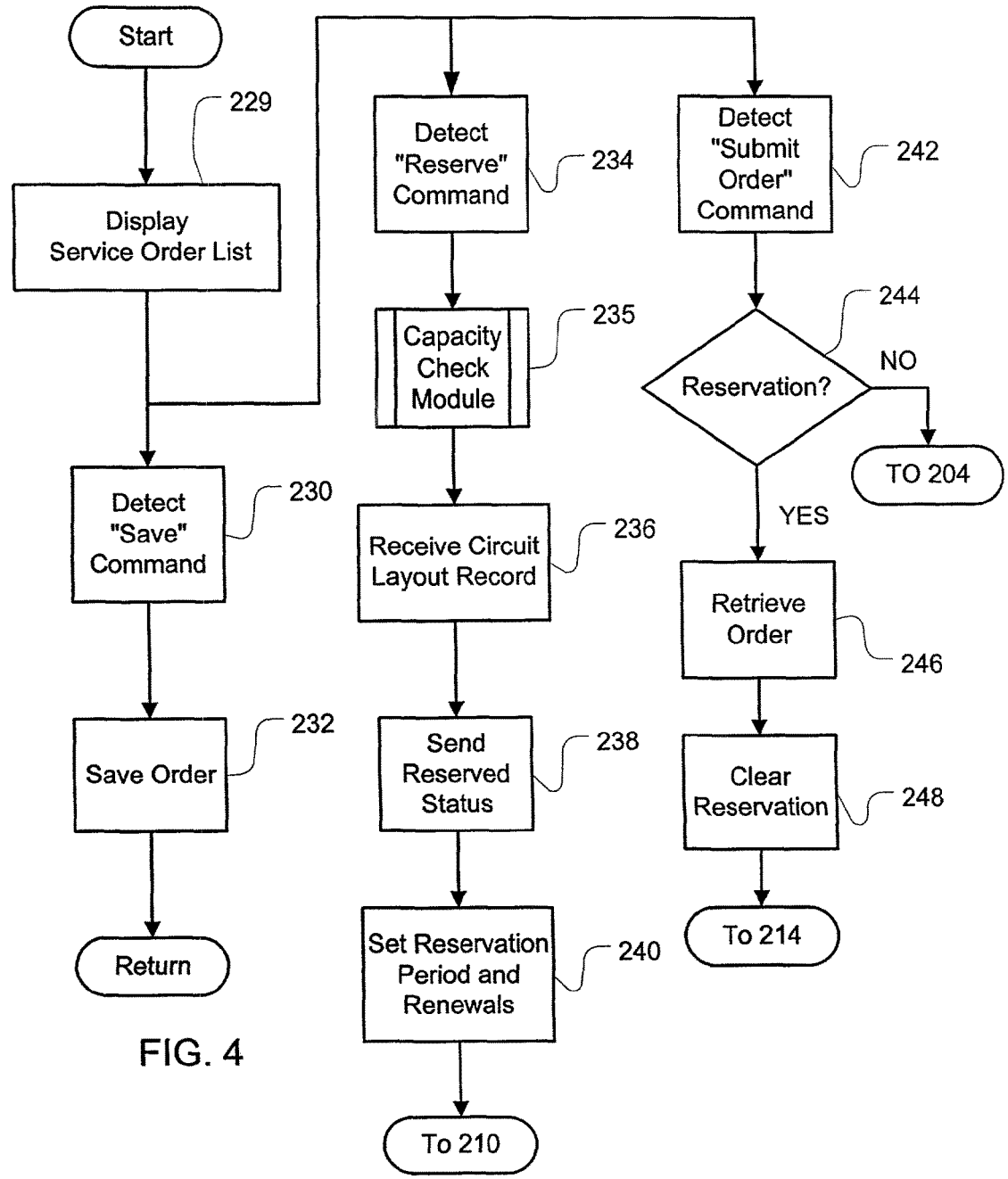
FIG. 4 illustrates the operations performed by the reservation/order module 208 of FIG. 2.

In FIG. 3 receive route operation 221 receives the route information. If the capacity check was part of submitting an order without reservation, order test operation 222 branches the operational flow to receive circuit layout record operation 212 described above for FIG. 2. If the capacity check was part of submitting an order based on a reservation, reservation test operation 223 branches the operation flow to receive circuit layout record operation 236 in FIG. 4 which will be described shortly. If the capacity check was for a new order, then the operation flow will pass through both the order test 222 and the reservation test 223 to the create route/cost information operation 224.

Create route/cost information operation 224 receives the route information and either already has cost information for the route or receives cost information from the operations research system 118 (FIG. 1). Create operation 224 combines the route and cost information to create the Price And Availability screen (FIG. 8) to be displayed to the customer by display operation 205 (FIG. 2).

If no route is available, receive no route operation 225 receives the no route message from the command control engine 104. Display no route operation 226 displays the "No Route" message to the customer. Initiate operation 227 sends a message to the command control engine 104 to analyze the service order and the network to determine why the network service is not available. This provides an opportunity for manual intervention off-line. An example of manual intervention is described in the '221 patent, cited above. The operation flow then returns from operation 227 to the main system program flow, and this completes the description of one embodiment of the check capacity module.

FIG. 4 shows the operations performed by the reservation/order module 208 of FIG. 2. The operation flow begins with display list operation 229 which begins the dialog with the customer regarding what actions to take when requested network service is available. Display operation 229 shows the Service Order List computer display screen shown in FIG. 9. The customer may select Start New Service Order, Save Customer Order, Reserve Bandwidth, or Submit Customer Order. The command selections by the customer are detected by detect operations 230, 234 and 242 in FIG. 4. The detection of start new order is not shown in FIG. 4 as this detection simply causes the operational flow to return to display operation 203 in FIG. 2.

Figure 9:
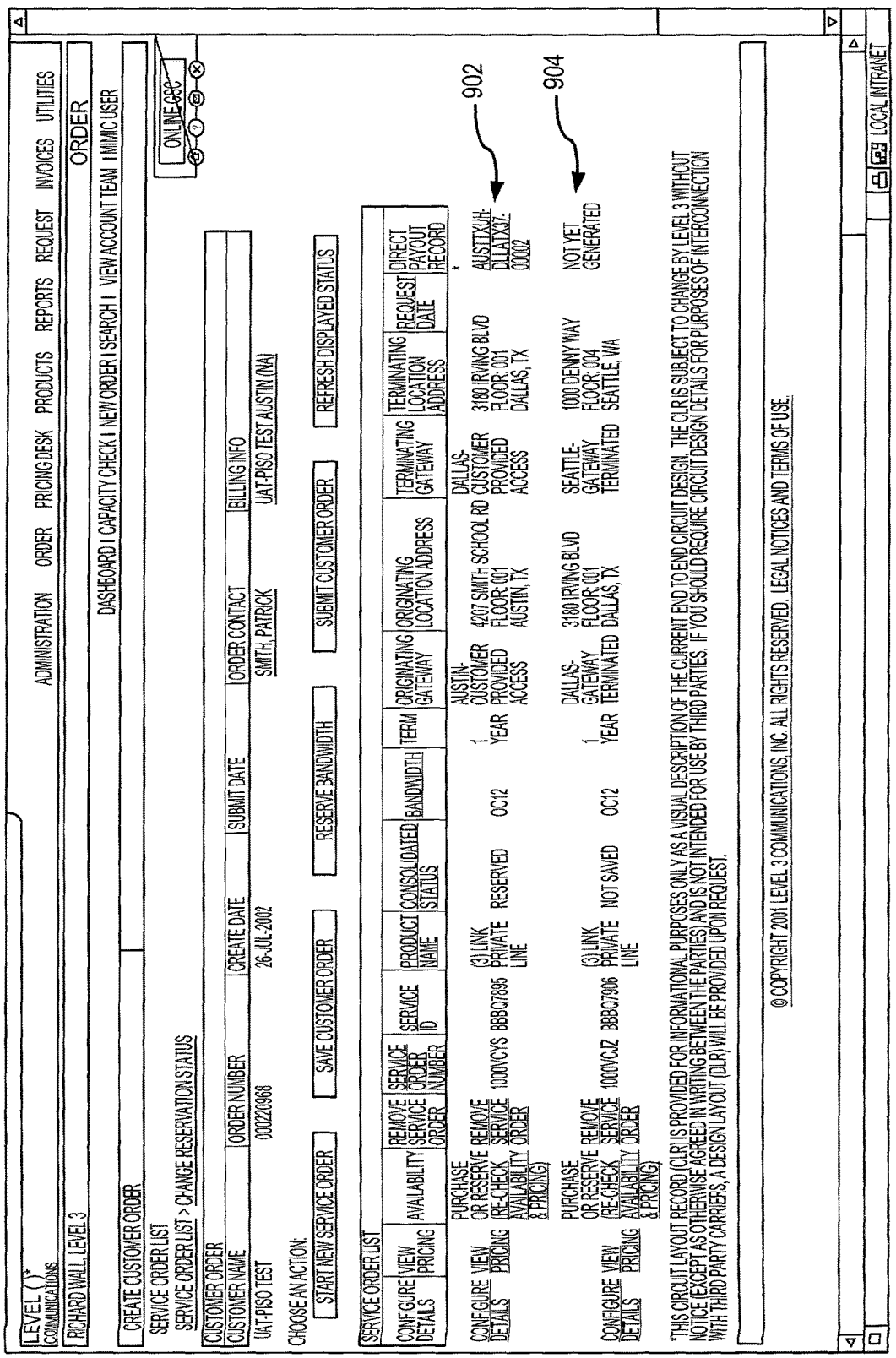
FIG. 9 is a screen shot of a Service Order List computer screen displayed to a customer.

Detect save operation 230 in FIG. 4 detects a Save Customer Order selection on the Service Order List screen of FIG. 9. The customer may select save when in the midst of working with an order entry, the customer is interrupted but does not want to lose the work performed so far on an order entry. When the save command is detected, save order operation 232 saves the information entered for the order and the status of the order. The operation flow then returns to the main program flow.

When a reserve bandwidth command is detected by detect operation 234, capacity check module 235 is invoked to recheck the availability of the route in the service order being reserved. The capacity check module (shown in FIG.

3) sends the network parameters for the new network service to the command control engine. The command control engine 104 (FIG. 1) checks the capacity, and assigns and validates network components to implement the order. If the network components consumed by the assignment are properly validated against the asset inventory database, the installation system of FIG. 1 will complete the circuit design to implement the route for the customer order. Once the circuit design is complete, the installation system returns a circuit layout record (FIG. 10) to the reservation/order module. Receive record operation 236 detects and saves the circuit layout record which indicates the network components to fill the service order are reserved. Send status operation 238 updates the customer display in the Service Order List screen to indicate "Reserved" for the service order. Set operation 240 sets the reservation period and number of reservation renewals allotted to the reservation. Operation flow then proceeds to the pending reservation module 210 (FIG. 1) which operates to monitor the reservation status for service orders.

When a submit order command is detected by detect operation 242, reservation test operation 244 tests whether the order was previously reserved. If the order is not reserved, the operation flow branches NO to check capacity module 204 in FIG. 2, and the order is submitted and processed as described above for FIG. 2. If the order has a reservation, the operation flow branches YES to retrieve order operation 246. Retrieve operation 246 retrieves the reserved service order. Clear operation 248 clears the reservation status of the service order and returns the operation flow to send confirmation operation 214 (FIG. 1). This completes the operations performed by the reservation/order module.

Figure 5:
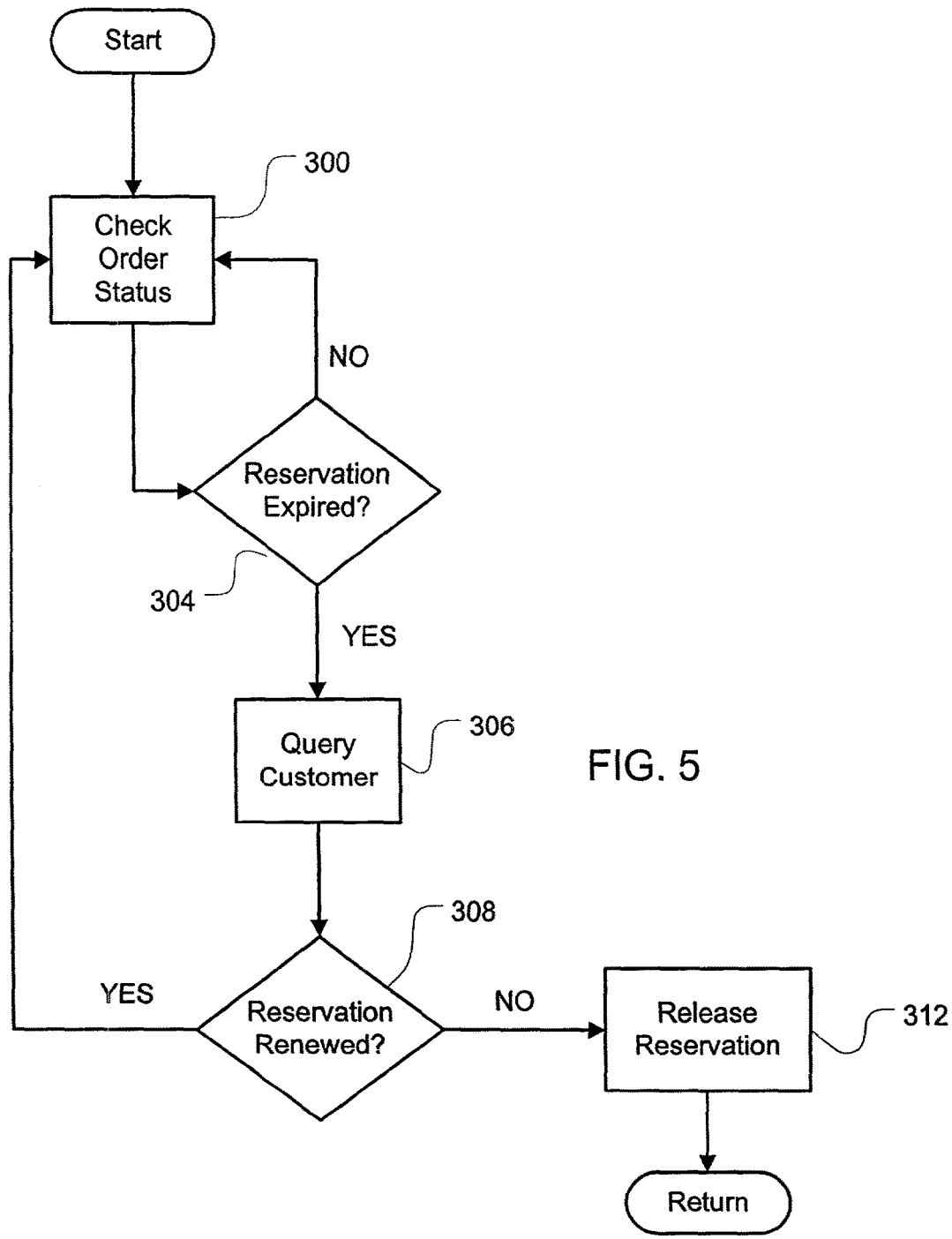
FIG. 5 illustrates the operations performed by the pending reservation module 210 of FIG. 2.

FIG. 5 shows the operations performed by the pending reservation module 210 of FIG. 2. This is the module that monitors the reservation status of service orders; this is done offline from the main flow for the order entry system. In FIG. 5, the operational flow begins with check status operation 300 to look-up the reservation status of a service order. Expiration test operation 304 tests whether the reservation period for the order has expired. The reservation period is set by operation 240 (FIG. 4). If the time period has not timed out, then the operation flow branches NO and returns to check order status operation 300. This monitoring loop will continue check the reservation status on a periodic basis until a submit order is detected from the customer or the reservation has expired.

If the reservation expires, then the operation flow branches YES from expiration test operation 304 to query operation 306. Query operation 306 sends a query to the customer giving the customer the option to either renew the reservation or submit the order. The option to renew is only provided if the number of renewals provided by set operation 240 (FIG. 4) have not been used up. If the customer is permitted to renew and responds by renewing the reservation, operation flow returns to check order status operation 300. If the customer does not renew the reservation, the operation flow branches NO to release operation 312. Release reservation operation 312 releases all the network components associated with the reserved service order and again makes those components available in the system for use by others. At a later time, the customer may again make the same service request. The network components and capacity may be available or not depending on other service requests received by the installation system. After the network components are released, the operation flow returns to the main system program. The pending reservation module continues to monitor the status of other service orders.

Figure 6:
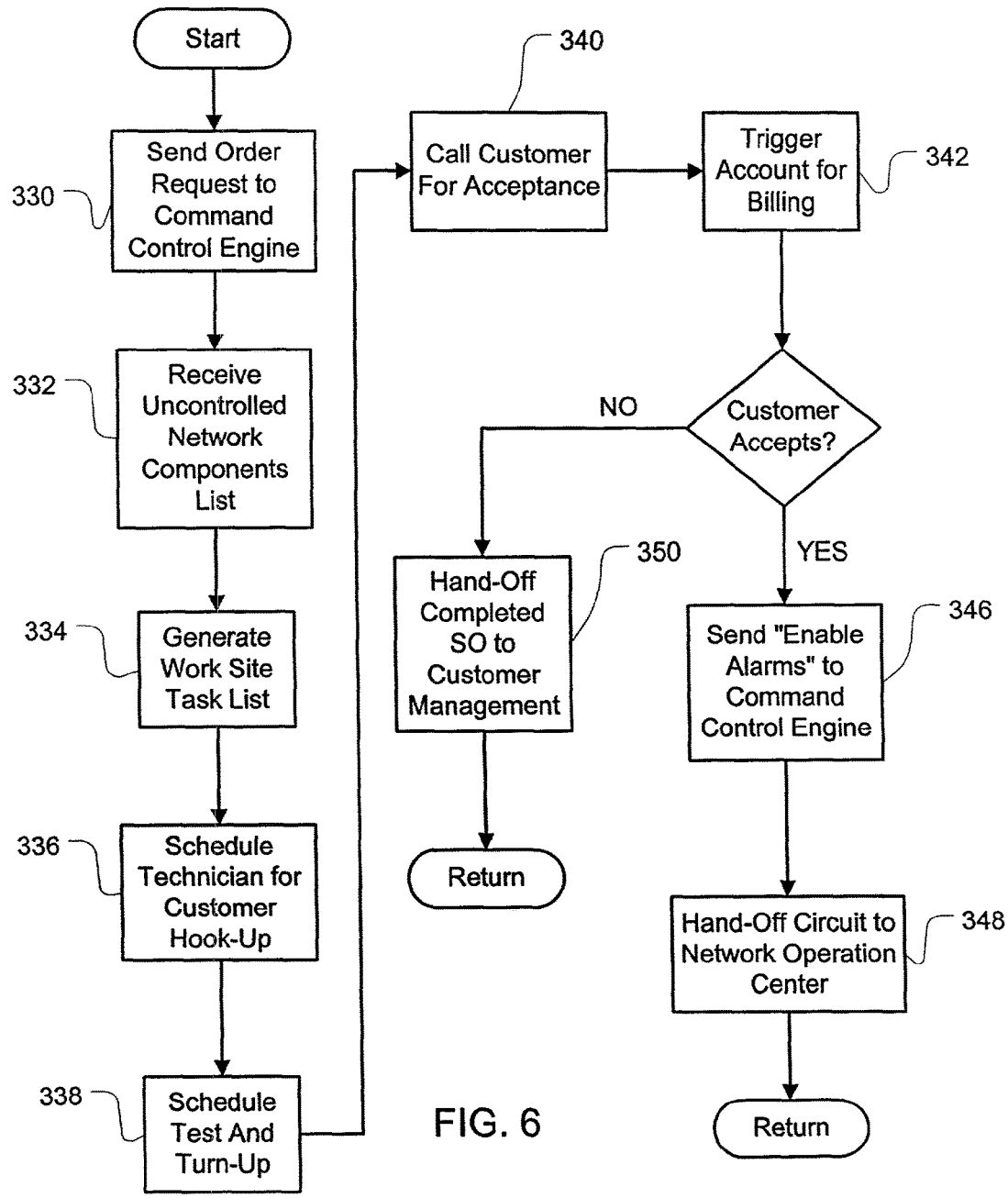
FIG. 6 shows the operations performed by the workflow management module 218 in FIG. 2.

Referring now to FIG. 6, the operational flow of the workflow management module 218 in FIG. 2 will be described in detail. In FIG. 6 the operation flow begins with service order request operation 330. Request operation 330 sends a request to the command control engine 104 (FIG. 1) to configure and activate the circuit for the customer service order. The installation system of FIG. 1 configures, activates and tests actual network components to implement the private line or communication line circuit for the service order. Network components in the circuit that cannot be controlled and activated by the installation system are identified and a list of uncontrolled network components is sent back to receive operation 332 of the workflow management module of FIG. 6.

Receive uncontrolled components operation 332 receives the uncontrolled components list. Uncontrolled network components are usually components at the originating and terminating end points or gateways of the network where the customer's equipment is hooked-up to the network. These uncontrolled components must be manually hooked-up to the network. It is also possible that a minimal number of uncontrolled components within the network might also require manual connection at a work site other than the originating and terminating end points. Once the list of uncontrolled components has been received, task generation operation 334 analyzes the list and generates a work site task list for a technician. Some of the work site tasks will include customer hook-up. Schedule operation 336 schedules a technician to hook-up the network to customer's equipment at the end points or gateways.

Schedule operation 338 schedules the communication line or private line circuit for test and turn-up. Test and turn-up is the final test and activation of the circuit attached to the customer's equipment. The test and turn-up is scheduled after hook-up and near in time to the customer request date (CRD), the first day of service for the customer.

If the test and turn-up operation is successful, a message or personal call goes to the customer in call operation 340 notifying the customer the private line circuit requested in the service order is ready and asking if the customer is ready to accept the private line circuit. This will normally occur on the CRD specified by the customer in the service order. Accordingly, since the private line is ready at CRD day, trigger account operation 342 will start the billing of the customer's account for the new private line service. If the private line circuit is ready ahead of the CRD day, and if the customer indicates he is not ready to accept, the trigger operation 342 does not begin billing the customer's account until the customer indicates he accepts service, or the CRD day is reached, whichever occurs first.

Accept test operation 344 detects whether the customer has accepted the new private or communication line service. If the customer accepts the service, the operation flow branches YES to enable alarms operation 346. Enable alarms operation 346 sends a message to the command control engine 104 (FIG. 1) to send commands to the network components along the route of the private line circuit enabling alarms that will detect faults in circuit. These fault alarms are monitored by a network operations center. After the alarms are enabled, the hand-off circuit operation 348 transfers responsibility for the private line circuit to the network operation center. The network operation center will monitor the private line circuit for faults indicated by the alarms, repair the faults, route around faults and otherwise maintain the private line service delivered to the customer. The operation flow then returns to the main system flow.

If the customer does not accept the private line service, the operation flow branches NO from test operation 344 to hand-off service order (SO) operation 350. Hand-off SO operation transfers responsibility for customer acceptance of the private line service to customer management. Customer management is a separate off-line operation that follows up with the customer until the customer is ready to accept the private line service. In this situation, the alarms in the private line circuit have not been set as the alarms might be falsely triggered because the circuit is quiet (no transmissions). The operation flow then returns to the main system flow.

Referring now to FIGS. 7-10 showing screen shots of screens displayed to the customer during the handling of an order for network service, the user interface will be described from the customer's perspective at the computer station 116 (FIG. 1). To access the order entry system, the customer dials directly into a network provider's order entry system or preferably signs on to the order entry system through the World Wide Web. To sign in through the web, the customer goes to the network provider's web site, selects "Log In" and signs on using a user ID and password. This will take the customer to a screen called the "Dashboard" (not shown) where the customer can select "New Order," "Capacity Check," or choose to open previous reserved service orders or previous saved designs (orders saved but not reserved). If the customer is placing a new order, then selection of New Order or Capacity Check will take the customer to the Check Capacity, Capacity Criteria screen shown in FIG. 7.

In FIG. 7 the screen shot prompts the customer to enter the parameters to begin requesting network service. Product dialog box 702 has drop down selections where the customer selects the desired network service; in this example, the network service is private line. All dialog boxes for capacity criteria have drop down selections to assist the customer. Region dialog box 704 prompts the customer select the geographical region for service such as North America, Europe, Asia, etc. Bandwidth dialog box 706 asks the customer to specify the bandwidth of the service. In this example OC12 refers to fiber optical network service at 633 megabits per second. Channelize dialog box 708 is asking the customer whether or not he wishes the private line divided into multiple channels. Term dialog box 710 allows the customer to select the duration of the lease. A longer lease carries a lower charge rate. Originating end dialog boxes 712 asks the customer to select a originating location for connection into the network provider's network. The customer is also prompted to indicate whether the customer will provide access to his equipment or whether the customer will locate his connecting equipment at a colocation (Colo) site with the network provider. At a Colo site the customer's equipment is located at the same site as a gateway of the network. Lastly at the originating end dialog boxes, the customer is asked for a Demarc selection and a Framing selection. Terminating end dialog boxes 714 prompts the customer for the same information at the terminating location as was request for the originating end of the network service. Finally, Customer Request Date boxes 716 ask the customer for the start date of the network service.

After the network service parameters for the new order are entered, the customer is prompted for an action. "Select Segments" button 718 allows the customer to specify some or all of a route for the service. "Check Capacity" button 720 requests the order entry system to check the capacity for the requested service just entered. "Add to Service Order List" button 722 allows the customer to save the request as a Service Order on the Service Order List.

Assuming the customer selects check capacity, the order entry system will check the capacity as described above and return the Check Capacity, Price and Availability screen shown in FIG. 8. This screen has a row 802 defining the service order, rows 804 reporting the capacity check results and a row 806 indicating the route price. The service order is given a number and references a customer order number. Parameters of the service are recited in the service order row. The capacity check results rows 804 indicate high level nodes of the route and the location identification number for the nodes. The price row indicates the setup or nonrefundable cost (NRC) and the monthly cost (MRC) along with a cost per mile. If the customer wants to add the service order to his customer order he clicks on add button 808.

A Service Order List screen as shown in FIG. 9 is next displayed to the customer. In FIG. 9, a customer order containing two service orders 902 and 904 is shown. Service order 902 for private line service between Austin and Dallas is shown as "Reserved." Service order 904 for private line service between Dallas and Seattle is shown as "Not Saved." There are five action buttons—Start New Service Order, Save Customer Order, Reserve Bandwidth, Submit Customer Order, and Refresh Displayed Status. If the customer has just finished the capacity check for service order 904, he would likely select the service order 904 and then select reserve bandwidth. The status would change to Pending and in a few minutes, when the private line is reserved, the status would change to Reserved. When the service order is reserved, a circuit layout record will also be available. For example in FIG. 9, the service order 902 has a reserved status and the circuit layout record ID shows up in the last column of the row for service order 902. If the customer wishes to see the circuit layout record, he would click on the record ID.

FIG. 10 is a screen shot of a portion of a circuit layout record. The circuit layout record identifies details of the circuit. The equipment type is shown in the second column. The record also includes physical location of equipment, system names for equipment, card ID's, port ID's and in general gives a knowledgeable customer all information necessary to understand the network components making up the private line or communication line service that has been reserved.

The customer could also have selected the submit customer order button on the Service Order List screen in FIG. 9. If so the order entry system proceeds with final installation of the network service and returns a service order confirmation screen (not shown) to the customer.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A system for ordering, testing and installing a network service over a telecommunications network for a customer, the system comprising:

a capacity check module, executed by a computer to:
  receive, from the customer, service order parameters comprising at least: a start date of the network service, a service term of the network service, a bandwidth of the network service, at least one geographical region of the network service, and at least one gateway of the network service;
  send the service order parameters to a command control engine to check availability and capacity of the network service for a route of the network service based on the service order parameters; and
  when the network service is available for the route, send a message indicating the availability, the capacity and a price of the network service to the customer;
a reservation and order module, executed by the computer to display the service order to the customer, and prompt the customer to order the network service in the service order when the network service is available;
an installation system, executed by the computer to install the network service in response to ordering of the network service, and complete a design of network components for the network service and return a design complete message as a circuit layout record; and
a workflow management module, that, in response to the design complete message resulting from the ordering of the network service, is executed by the computer to:
  send a request to configure and activate the network service to the command control engine,
  receive a list of the network components associated with the at least one gateway of the network service,
  analyze the received list of the network components, to further generate a work site task list,
  schedule the installation of the network service between the customer's equipment and the at least one gateway according to the work site task list,
  test and activate, after the installation, the network service between the customer's equipment and the at least one gateway,
  notify, after the testing and activating, the customer that the network service is ready and prompt the customer to accept the network service,
  when the customer has accepted the network service, enable alarms along the route of the network service to detect faults, and
  initiate repair of the detected faults using a network operation center;
wherein the reservation and order module is further executed by the computer to display the circuit layout record to the customer.

2. The system as recited claim 1, further comprising:
a confirmation device executed by the computer to, in response to the design complete message resulting from the ordering of the network service, send an order confirmation to the customer.

3. The system as recited in claim 1, wherein the capacity check module is further executed by the computer to, in response to a reserve request or an order request, recheck the capacity of the network service to satisfy the service order before the installation system completes the design of the network components for the network service.

4. The system as recited in claim 1, further comprising:
a pending reservation module executed by the computer to:
  monitor a reservation status of the service order when the customer reserved the network service; and
  prompt the customer to renew the reservation when the reservation expires.

5. The system as recited in claim 1, wherein the workflow management module is further executed by the computer to manage the installation of the network components in the design of the network components for the network service.

6. The system as recited in claim 1, wherein the list of network components comprises at least two uncontrolled network components at the originating and terminating end points of the telecommunication network.

7. The system as recited in claim 6, wherein the at least two uncontrolled network components requires manual installation to the telecommunications network.

8. The system as recited in claim 6, wherein the work site task list is generated for a technician to manually install the at least two uncontrolled network components to the telecommunications network.

9. A computer-implemented method for ordering, testing and installing a network service over a telecommunications network for a customer, the computer implemented method comprising:
receiving, from the customer, service order parameters comprising at least: a start date of the network service, a service term of the network service, a bandwidth of the network service, at least one geographical region of the network service, and at least one gateway of the network service;
sending, by a computer, the service order parameters to a command control engine to check availability and capacity of the network service for a route of the network service based on the service order parameters;
when the network service is available for the route, sending a message indicating the availability, the capacity and a price of the network service to the customer;
displaying, by the computer, the service order to the customer, and prompting the customer to order the network service in the service order when the network service is available;
installing, by the computer, the network service in response to ordering of the network service, and completing a design of network components for the network service and returning a design complete message as a circuit layout record; and
in response to the design complete message resulting from the ordering of the network service:
sending, by the computer, a request to configure and activate the network service to the command control engine,
receiving, by the computer, a list of the network components associated with the at least one gateway of the network service,
analyzing, by the computer, the received list of the network components, to further generate a work site task list,
scheduling, by the computer, the installation of the network service between the customer's equipment and the at least one gateway according to the work site task list,
testing and activating, by the computer, after the installation, the network service between the customer's equipment and the at least one gateway, notifying, by the computer, after the testing and activating, the customer that the network service is ready and prompt the customer to accept the network service, enabling, by the computer, alarms along the route of the network service to detect faults when the customer has accepted the network service, initiating, by the computer, repair of the detected faults using a network operation center, and displaying, by the computer, the circuit layout record to the customer.

10. The computer-implemented method of claim 9, further comprising:

sending, by the computer, an order confirmation to the customer resulting from the ordering of the network service.

11. The computer-implemented method of claim 9, further comprising:

rechecking, by the computer, the capacity of the network service to satisfy the service order before completion of the design of network components for the network service in response to a reserve request or an order request.

12. The computer-implemented method of claim 9, further comprising:

monitoring, by the computer, a reservation status of the service order when the customer reserved the network service; and prompting, by the computer, the customer to renew the reservation when the reservation expires.

13. The computer-implemented method of claim 9, further comprising:

managing the installation of the network components in the design of the network components for the network service.

14. The computer-implemented method of claim 9, wherein the list of network components comprises at least two uncontrolled network components at the originating and terminating end points of the telecommunication network.

15. The computer-implemented method of claim 14, wherein the at least two uncontrolled network components requires manual installation to the telecommunications network.

16. The computer-implemented method of claim 14, wherein the work site task list is generated for a technician to manually install the at least two uncontrolled network components to the telecommunications network.

* * * * *